June 2, 1970     W. C. BUZZARD ET AL     3,515,447
DESIGN OF A LAMINATED BALL OR ROLLER FOR
APPLICATION IN A BEARING
Filed July 2, 1968

INVENTORS
WALLACE C. BUZZARD
JOSEPH E. KRYSIAK
BY *Harry A. Herbert Jr*
ATTORNEY
*Arthur R. Parker*
AGENT United States Patent Office 3,515,447
Patented June 2, 1970

3,515,447
DESIGN OF A LAMINATED BALL OR ROLLER FOR APPLICATION IN A BEARING
Wallace C. Buzzard, 5625 Leibold Drive 45424, and Joseph E. Krysiak, 510 Wilmington Ave. 45420, both of Dayton, Ohio
Filed July 2, 1968, Ser. No. 742,092
Int. Cl. F16c 33/00
U.S. Cl. 308—188    5 Claims

ABSTRACT OF THE DISCLOSURE

A laminated hollow ball or roller construction for use in a bearing and having an inner core composed of two hemispheres welded together along one diametral joint line, and a relatively thin, outer covering consisting of two hemispherical shells abutting against and welded to the inner core along a different diametral joint line to thereby improve the ball or roller resistance to fracture. In a second form, the inner core may be solid or composed of two hemispheres of relatively hard material covered by a pair of relatively thin material hemispherical shells welded thereto to thereby ensure brinelling of the rolling elements first before ruining the bearing races.

BACKGROUND OF THE INVENTION

This invention relates generally to a hollow ball or roller of improved laminated construction and, in particular, to a laminated hollow ball or roller that is designed to resist fracture when used in a bearing and when under loads and stresses and to thereby ensure greater life of the bearing races.

The use of a laminated construction for forming balls or rollers adapted to be used in a bearing has provided a unique lightweight structure that is adequate to resist the loads and stresses inherent in its application to bearing arrangements. One problem in such bearings has been the excessive brinelling of the bearing races or raceways from their rolling contact with a bearing or bearings made of a sufficiently hard enough material to successfully resist the bearing loads and stresses applied thereto. This excessive brinelling of the bearing races results in the relatively early and rather expensive ruination of the main bearing structure. However, with the improved laminated structure utilized with the present invention and method of constructing the same, this problem of early ruination of the bearing races is eliminated, or, at least substantially reduced, as will become readily apparent hereinafter from the following summary and detailed description thereof. Also, the inventive ball or roller member offers an improved configuration of increased strength and therefore resistance to excessive loads and stresses, as will likewise readily appear hereinafter.

SUMMARY OF THE INVENTION

A principal object of the present invention, therefore, resides in a new and improved method of construction and laminated hollow ball or roller structure adapted for use in a bearing arrangement and in which a laminated core member of relatively hard material is encompassed within a laminated covering element that is made of a relatively soft material and resulting in brinelling of the rolling elements before the bearing races are damaged.

A further object of the invention is in the development of an improved laminated hollow ball/roller structure and an improved method of producing the same that incorporates a unique combination of a laminated core element consisting of two hemispheric shells welded to each other along one diametral joint line and an improved laminated covering element that is welded to the core element and which consists of hemispheric shell segments that are welded to each other along a second diametral joint line that is different from that of the welded diametral joint line incorporated in the core element and, therefore, increases the resistance of the hollow ball or roller formed thereby to fracture.

Other objects and advantages of the invention will appear from the following disclosure.

DESCRIPTION OF THE PREFERRED EMBODIMENT

Figure 1:
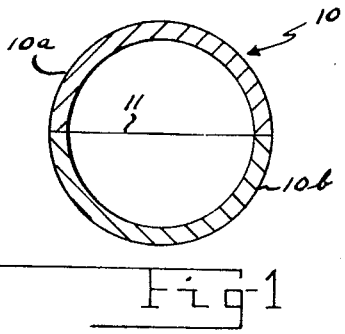
FIG. 1 is a cross-sectional view of the assembled, relatively thin hemispherical shells comprising one form of the core element used with the improved laminated ball construction of the present invention.

Referring generally to the drawing and, in particular, to FIG. 1 thereof, the hollow core or innermost element of the present hollow ball construction is indicated generally at 10 as including a pair of matching hemispheres 10a and 10b of equal diameter and welded together along a diametral joint line indicated by the solid line at 11. Because of the laminated construction of the present hollow ball configuration, the hemispheres 10a and 10b, as well as the hemispheres comprising the ball covering elements, to be described hereinafter in detail, consist of shells that may be made relatively thinner, even in total cross-section than is normal with the single-shell arrangement and yet is stronger due merely to the laminated construction per se.

Figure 2:
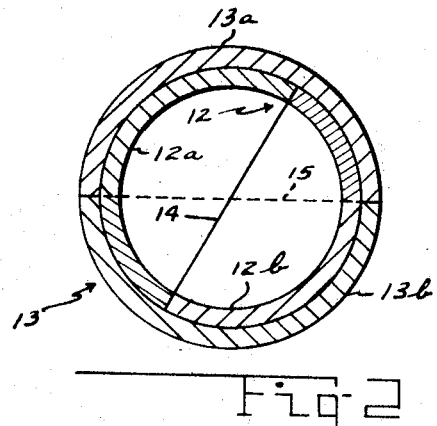
FIG. 2 is a second cross-sectional view of the assembled, relatively thin hemispherical shells comprising the laminated outer covering element used with the core element of FIG. 1 and showing the offset relation between the welded diametral joint lines used with the inner and outer covering element portions thereof.

With particular reference to FIG. 2, the series of shells comprising the hemispheres of the outer covering elements for the aforesaid core element 10 are indicated respectively and generally at 12, consisting of the pair of intermediate shells 12a and 12b, and at 13, consisting of the pair of outer shells at 13a and 13b. The shells 12a and 12b are welded together along a diametral joint line indicated by the dotted line at 14, whereas the shells 13a and 13b are welded along a different diametral joint line offset from the first-named joint line and indicated by the solid line at 15. This staggering of the diametral joint lines of each respective pair of shells constitutes a unique feature of the present invention, which feature is fully shown in the completely assembled view of FIG. 3.

Figure 3:
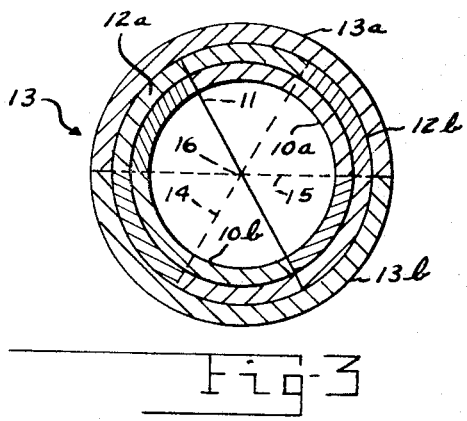
FIG. 3 is a further cross-sectional view, generally illustrating the complete assembly of the outer covering elements hemispherical shells of FIG. 2 to the core element of FIG. 1 and, is particular, showing the offset relation between the various welding diametral joint lines forming the key feature of the first modification of the present invention.

In the above-referred to FIG. 3, the diametral joint line 11 of the core or innermost element 10 and the diametral joint lines 14 and 15 respectively depicting the weld between the shells 12a and 12b, and 13a and 13b constituting the intermediate and outer most pair of hemispheres, as previously described for the present hollow ball configuration, are depicted as being offset relative to each other at an approximately 60° angle; however, other angular arrangements may be utilized without departing from the true spirit or scope of the invention. Thus, all of the diameters of the foregoing hemispheric shells have only two points of coincidence from the exterior circumference to the interior of the hollow ball constructed by the method of the present invention. One of these two points of coincidence is denoted by the reference numeral at 16 in FIG. 3. Thus, the probabilities of a ball fracture or rupture due to bad weld spots that may be formed during the welding process and which extend through the wall of the ball is greatly reduced by the improved welding means of the present invention, since, except for the two points mentioned above, the respective diametral joint lines of weld are non-coincidental.

Figure 4:
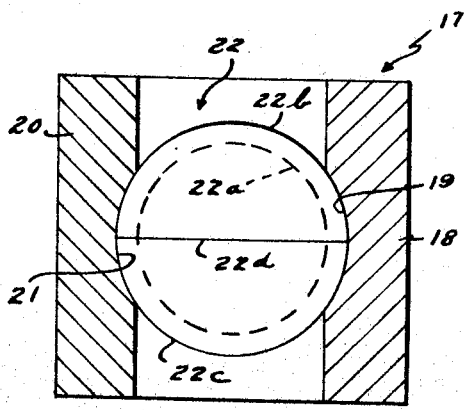
FIG. 4 is a partly cross-sectionail view of a modified form of the laminated ball construction of FIGS. 1–3 shown mounted in a ring segment of a ball bearing.
Figure 5:
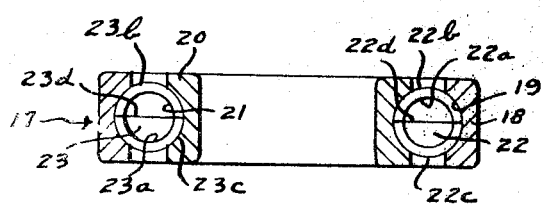
FIG. 5 is a second, partly cross-sectional view, showing a pair of the modified form of laminated ball construction of FIG. 4 mounted in a ball bearing.

Referring particularly to FIGS. 4 and 5 of the drawing, a modified form of laminated ball construction is depicted as being mounted in a ball bearing that is illustrated generally at 17 as including an outer ring and outer ring raceway respectively at 18 and 19, and an inner ring and inner ring raceway respectively at 20 and 21. Mounted for rolling movement within the aforesaid outer and inner raceways 19 and 21 are a series of the aforesaid modified construction laminated balls of the present invention. One of said modified balls is shown at 22 in FIG. 4 and an identical pair of this form of the invention are shown respectively at 22 and 23 in FIG. 5. In the modification illustrated, the ball construction is indicated as consisting of a solid core element at 22a and 23a (note FIG. 5). However, this core element 22a, 23a may also be of a laminated configuration and, therefore, hollow in form as has been previously illustrated and described in connection with the inventive form of FIGS. 1–3. In any event, the important distinction of the form of the invention illustrated in FIGS. 4 and 5 is that the laminated ball construction thereof consists, in part, of the already noted core element 22a or 23a, which is to be composed of a relatively harder material, as for example, a slightly harder type of steel. The said core element is, in turn, covered by a relatively thin, covering element consisting of a pair of hemispherical shells, such as indicated at 22b and 22c for the ball 22, shown welded along the line 22c, and at 23b and 23c for the ball 23, shown welded along the line 23d (note FIG. 5).

The foregoing covering element hemispherical shells 22b and 22c, and 23b and 23c are, in accordance with the teaching of the modified form of the present invention, made of slightly less hard material, such as for example a somewhat softer steel than is the previously described core element. These shells are welded to the said core elements by any appropriate welding means.

With the above described arrangement of a solid or laminated (hollow) core element of a relatively harder material that is covered by a slightly softer material, the "brinelling" effect inherent in the usual type of ball bearing in the bearing races, resulting in the early ruination of the latter, will thereby be transferred to the rolling element itself. In particular, the previously noted relatively thin, shell-covering elements 22b and 22c, and 23b and 23c of relatively softer material will deform or brinell under excessive loading and operational conditions before the normal brinelling effect occurs in the bearing races themselves and, in this manner, the unique arrangement of the present form of the invention will prevent or, at least, substantially delay the eventual ruination of the bearing races and thus provide a much longer wearing life of the bearing by ensuring that such brinelling occurs primarily on the rolling elements and not on the races as in the usual case. Although the material of both the core elements 22a and 23a, and the cover elements 22b and 22c, and 23b and 23c, has been specified hereinabove as consisting of two different grades of steel, it is apparent that different materials entirely could be used without departing from the true spirit or scope of the invention, so long as they are appropriately strong enough and are made one slightly softer than the other. Also, recent bearing studies have shown that permanent deformation in the rolling elements does not appreciably affect endurance life nor result in large overall friction increases. Furthermore, although the present description and drawing is made with specific reference to a ball configuration, it is obvious that the same improved construction of the present invention is equally applicable to the roller as well. Finally, the present invention is specifically described with reference to a laminated and spherical configuration involving a core element and two laminated cover elements. However, more or less laminations may be used as desired.

We claim:

1. In a method of producing a laminated rolling member of relatively lightweight construction and of a strength sufficient to act in a bearing structure, the steps comprising; placing a pair of hemispherical shells in a high vacuum, or inert gas atmosphere; cojoining said shells into a spherical-shaped internal core member as by welding along a first diametral joint line oriented at a preselected angle; forming a laminated and relatively thin, cover element for said internal core member by initially placing in a high vacuum, or inert gas environment externally-arranged, hemispherical shell means having an internal diameter exactly equal to the external diameter of said internal core member-hemispherical shells and disposed in close-abutting and nested relation surrounding said last-named hemispherical shells; and welding said externally-arranged, hemispherical shell means to said internal core member along a second diametral joint line arranged at an offset angle to the preselected angle of said first-named diametral joint line to thereby provide for a laminated ball configuration of improved strength and resistance to rupture under excessive loads and stresses.

2. In a method of producing a laminated rolling member as in claim 1, and further including the steps of placing a plurality of pairs of additional hemispherical shells in a high vacuum, or inert gas environment in surrounding relation to said core member and said first-named cover element, and welding said additional hemispherical shells to each other and in close abutting relation to said first-named cover element respectively along diametral joint lines arranged in staggered relation to each other and to said first- and second-named, diametral joint lines to thereby provide a laminated rolling member being collectively of ball configuration and of improved resistance to fracture.

3. In a method of producing a laminated rolling member as in claim 1, wherein the said steps may include placing a pair of semicylindrical shells in a high vacuum, or inert gas atmosphere; cojoining said shells into a cylindrically-shaped internal core member as by welding along a first welded joint; forming a laminated cover element for said internal core member by initially placing in a high vacuum, or inert gas environment externally-arranged semicylindrical shell means disposed in nested relation surrounding said last-named semicylindrical shells; and welding said externally-arranged semicylindrical shell means to said core means along a second welded joint arranged at an offset angle to said first-named welded joint to thereby provide for a laminated roller configuration of improved resistance to rupture of the welded joints.

4. In a method of producing a laminated rolling member as in claim 1, wherein the formation of the internal core member and the laminated cover element may respectively include the steps comprising; initially placing a solid ball or roller-internal core member of a given hardness and a pair of matching hemispherical/semicylindrical shells of slightly less hardness in nested and covered relation with said internal core member within a high vacuum, or inert gas atmosphere; and welding the pair of matching shells in close abutting relation to said internal core member to thereby effect brinelling of the cover element portion of said laminated rolling member before the bearing races are damaged.

5. A laminated rolling member adapted to be mounted in a bearing structure having inner and outer races, and comprising; a hollow internal core member having a first, interior pair of hemispherical shells welded together along one welding joint; and means for covering and laminating said internal core member comprising a second, intermediate pair of hemispherical shells each incorporating an inside diameter exactly equal to, and therefore precisely nesting with the outside diameter of said first-named pair of hemispherical shells, said intermediate hemispherical shells being welded to said internal core member along a second welding joint arranged in staggered relation to said first-named welding joint; and at least one other pair of outermost hemispherical shells each having inside diameters precisely equal to, and thereby closely nesting with the outside diameter surfaces of said second, intermediate pair of hemispherical shells, said outermost pair of hemispherical shells being welded to said second pair of hemispherical shells along a third welding joint disposed in offset relation to both of said first- and second-named welding joints to thereby collectively provide a combined welded laminated ball member of increased resistance to fracture; said internal core member further including a solid structure comprised of a relatively hard material, and said internal core member-covering and laminating means further comprising a material of slightly less hardness than said internal core member to thereby provide brinelling in the said rolling member instead of in the bearing races.

References Cited
UNITED STATES PATENTS 3,181,864    5/1965    Rayke.
2,177,928    10/1939    Knudsen.
675,933    6/1901    Clow _____ 308—215

MARTIN P. SCHWARDON, Primary Examiner

F. SUSKO, Assistant Examiner